United States Patent
Yasui

(10) Patent No.: US 7,503,753 B2
(45) Date of Patent: Mar. 17, 2009

(54) VARIABLE CAPACITY FLUID PUMP FOR AN ENGINE

(75) Inventor: Yuji Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 840 days.

(21) Appl. No.: 11/032,083

(22) Filed: Jan. 11, 2005

(65) Prior Publication Data

US 2005/0175484 A1    Aug. 11, 2005

(30) Foreign Application Priority Data

Jan. 26, 2004    (JP) ............................. 2004-016615

(51) Int. Cl.
    *F04B 35/00*    (2006.01)
(52) U.S. Cl. ........................................ 417/53; 417/380
(58) Field of Classification Search .................. 417/53, 417/212, 214, 223, 380, 18; 123/198 R, 123/198 C; 475/72, 73
    See application file for complete search history.

(56) References Cited

U.S. PATENT DOCUMENTS

| | | | | |
|---|---|---|---|---|
| 3,944,253 A | * | 3/1976 | Ripley, III | ................... 280/238 |
| 4,258,586 A | * | 3/1981 | Numazawa et al. | ......... 180/292 |
| 4,286,477 A | * | 9/1981 | Meyerle et al. | ................ 475/82 |
| 5,512,021 A | * | 4/1996 | Shash | .............................. 475/1 |
| 5,512,022 A | * | 4/1996 | Suzuki | ........................... 475/2 |
| 5,575,735 A |  | 11/1996 | Coutant et al. | |
| 5,971,881 A | * | 10/1999 | Jolliff | ........................... 475/89 |
| 2003/0119620 A1 | * | 6/2003 | Zwilling et al. | ............. 475/219 |
| 2003/0125865 A1 |  | 7/2003 | Yuji | |

FOREIGN PATENT DOCUMENTS

| | | |
|---|---|---|
| JP | 2003-155938 | 5/2003 |
| JP | 2003-195908 | 7/2003 |

* cited by examiner

*Primary Examiner*—Michael Cuff
*Assistant Examiner*—Vikansha S Dwivedi
(74) *Attorney, Agent, or Firm*—Arent Fox LLP

(57) ABSTRACT

A variable capacity fluid pump that can be controlled independently of the rotation of the engine is provided. The fluid pump comprises a planetary gear mechanism having a first gear, second gears and a third gear. The second gears are connected to a crankshaft of the engine and transmits a rotational force of the crankshaft. The third gear is connected to the fluid pump. The fluid pump further comprises braking means connected to the first gear. The breaking means generates a braking force upon the first gear. The fluid pump further comprises a one-way clutch provided between the second gears and the third gear. The braking means controls a rotational speed of the first gear so that a rotational speed of the fluid pump is controlled independently of a rotational speed of the crankshaft of the engine.

39 Claims, 11 Drawing Sheets

(a) Side View (a) Side View

Crankshaft Rotation

Oil Pump Rotation (b) Front View (a) When Clutch is Engaged (b) When Clutch Freewheels (a) Brake OFF (b) Brake ON

VARIABLE CAPACITY FLUID PUMP FOR AN ENGINE

BACKGROUND OF THE INVENTION

The present invention relates to a control for a fluid pump (an oil pump or a water pump) of an engine.

In general, a lubrication apparatus and a cooling apparatus are supplied with an engine. The lubrication apparatus is an apparatus for reducing the frictional resistance by using oil for each section of the engine. The lubrication apparatus uses an oil pump coupled to a crankshaft of the engine to feed oil to a lubrication passage. The cooling apparatus is an apparatus for keeping the temperature at which the engine can continue rotating with stability. The cooling apparatus feeds cooling water to a passage disposed in a cylinder block and a cylinder head of the engine to prevent the engine from overheating. The cooling apparatus uses a water pump coupled to the crankshaft of the engine to circulate the cooling water. These apparatuses are required for maintaining the engine in the normal operating condition. These apparatuses have an effect of improving the engine efficiency, that is, the fuel efficiency.

There is a problem with a method for driving such fluid pumps (oil pump and water pump) in the lubrication apparatus and the cooling apparatus. Since these pumps are connected to the crankshaft of the engine, a driving force is provided to these pumps in accordance with the engine rotation. The rotational speed of each pump is determined in accordance with the engine rotational speed. The discharge capacity of the pump increases as the rotational speed of the engine increases. If the engine rotational speed is low, the discharge capacity of the pump is small. Such a small discharge capacity may reduce the fuel efficiency, especially in the engine having a variable valve driving mechanism and/or a variable compression ratio mechanism because responsiveness of those mechanisms may deteriorate when the engine rotational speed is low. If the pump is configured to generate a sufficient pump output when the engine rotational speed is low, work by the pump is excessive under the condition where the engine rotational speed is high and the engine load is low. Such redundant work by the pump reduces the overall engine efficiency.

As shown in FIG. 11, it is preferable that ideal oil pressure characteristics of an oil pump (shown by solid lines) generate a sufficient high oil pressure to meet a requirement of the hydraulic system when the engine rotational speed is low, and generate a sufficient low oil pressure appropriate to the condition where the engine rotational speed is high and the engine load is low, as compared with the characteristics of a conventional pump (shown by dashed line). Thus, there is a need for a fluid pump that is capable of producing a desired output independently of the engine rotational speed.

As one of the solutions to meet such need, there is an electrically-driven pump. The electrically-driven pump can control the rotation of the pump independently of the engine rotation because it utilizes the driving force of a motor for rotating the pump. There are two types of the electrically-driven pump. One is a brush motor and the other is a brushless motor.

Although the electrically-driven pump can control a flow rate of the pump independently of the engine rotational speed, there are some problems. If a brush motor is used, its reliability is low because it is susceptible to aging and failure due to wear of the brush. If a brushless pump is used, a PDU (power distribution unit) is required for controlling the magnetic field by the three-phase lines, which increases the weight of the pump system and hence decreases the fuel efficiency.

Thus, there is a need for a pump that meets ideal oil pressure characteristics as shown in FIG. 11 (in case of an oil pump) and other ideal characteristics regarding the rotational speed and the water temperature (in case of a water pump) while implementing high reliability and high fuel efficiency.

On the other hand, a sliding mode control is known in the field of engine control. The sliding mode control is capable of adjusting the characteristics that a controlled variable follows and converges to a desired value (refer to the Japanese Patent Application Unexamined Publication No. 2003-155938). The sliding mode control can reduce redundant work and improve the fuel efficiency Further, a control using a delta-sigma ($\Delta\Sigma$) modulation algorithm is known. Such a delta-sigma modulation algorithm can implement a high accurate control regardless of variations in the operating characteristics of a controlled object as long as the controlled object has a capability of generating an appropriate output in response to an on/off control input (refer to the Japanese Patent Application Unexamined Publication No. 2003-195908).

SUMMARY OF THE INVENTION

According to one aspect of the present invention, a variable capacity fluid pump that can be controlled independently of the rotation of the engine is provided. The fluid pump comprises a planetary gear mechanism having a first gear, a second gear and a third gear. The second gear is connected to a crankshaft of the engine and transmits a rotational force of the crankshaft. The third gear is connected to the fluid pump. The fluid pump further comprises braking means connected to the first gear. The breaking means generates a braking force upon the first gear. The fluid pump further comprises a one-way clutch provided between the second gear and the third gear. The braking means controls a rotational speed of the first gear so that a rotational speed of the fluid pump can be controlled independently of a rotational speed of the crankshaft of the engine.

Work of the fluid pump often varies depending on the engine load rather than depending on the engine rotational speed. According to the present invention, the work of the fluid pump can be controlled independently of the engine rotational speed. If the engine is in a condition where requested work of the fluid pump is small, the work of the pump can be actually reduced regardless of the engine rotational speed to improve the fuel efficiency. Since the pump is not electrically driven, the efficiency of converting the engine work to the pump work is high, thereby improving the fuel efficiency.

According to one embodiment of the present invention, the first gear includes a ring gear, the second gear includes a plurality of planetary gears, and the third gear includes a sun gear. According to this structure, when requested work of the pump increases, the rotational speed of the pump can be increased by applying the braking force to the ring gear, which reduces the size of the pump and friction of the pump. Since the weight of the pump can be reduced and the driving efficiency is improved, the fuel efficiency is further improved.

According to one embodiment of the present invention, the braking means includes a hysteresis material portion that is provided to rotate in accordance with the first gear and an electromagnet for generating a magnetic field through the hysteresis material portion. The braking force is increased or decreased by adjusting the magnetic field. Thus, since the braking means is configured in a non-contact manner, it can be prevented that the performance of the brake deteriorates due to wear of the pump. Since the efficiency of generating the braking force is high, losses of the electric power are low, thereby improving the fuel efficiency.

According to one embodiment of the present invention, the braking force is determined so that a sensor output detected by a sensor provided in the fluid pump converges to a desired value. The desired value is set in accordance with an operating condition of the engine. Thus, even if the characteristics of the braking force generated in response to the control input vary due to variations, aging, and heat generation of the braking means, required pump work can be achieved.

According to one embodiment of the present invention, the braking force is determined by a 2-degree freedom response assignment control. Since the 2-degree freedom response assignment control can prevent the work (the rotational speed) of the pump from overshooting the desired value, redundant work caused by such overshooting can be reduced, thereby improving the fuel efficiency.

According to one embodiment of the present invention, the braking force is controlled by a controlled variable that is modulated by one of a delta-sigma ($\Delta\Sigma$) modulation algorithm, a sigma-delta ($\Sigma\Delta$) modulation algorithm and a delta ($\Delta$) modulation algorithm. Thus, even when the braking means has hysteresis characteristics or has a difficulty in generating a small amount of the braking force, required pump work can be precisely achieved. Reduction of the fuel efficiency and variation in the pump work which may be caused due to redundant work of the pump can be prevented.

According to one embodiment of the present invention, the fluid pump is an oil pump. The sensor is an oil pressure sensor for detecting an oil pressure of the oil pump. Alternatively, the sensor is a rotational speed sensor for detecting a rotational speed of the oil pump. Thus, since a sufficient oil pressure can be generated by increasing the rotational speed of the oil pump even when the engine rotational speed is low, the responsiveness of oil hydraulic devices can be maintained. The operating condition of the engine can be optimized to improve the fuel efficiency.

According to one embodiment of the present invention, the fluid pump is a water pump. The sensor is a water temperature sensor for detecting a water temperature of the water pump. Alternatively, the sensor is a rotational speed sensor for detecting a rotational speed of the water pump. Since the work of the pump can be reduced by slowing down the water pump when the engine is in a low load condition where the necessity for cooling the engine is low, the fuel efficiency is improved.

DESCRIPTION OF THE PREFERRED EMBODIMENTS

1. Variable Capacity Oil Pump

Figure 1:
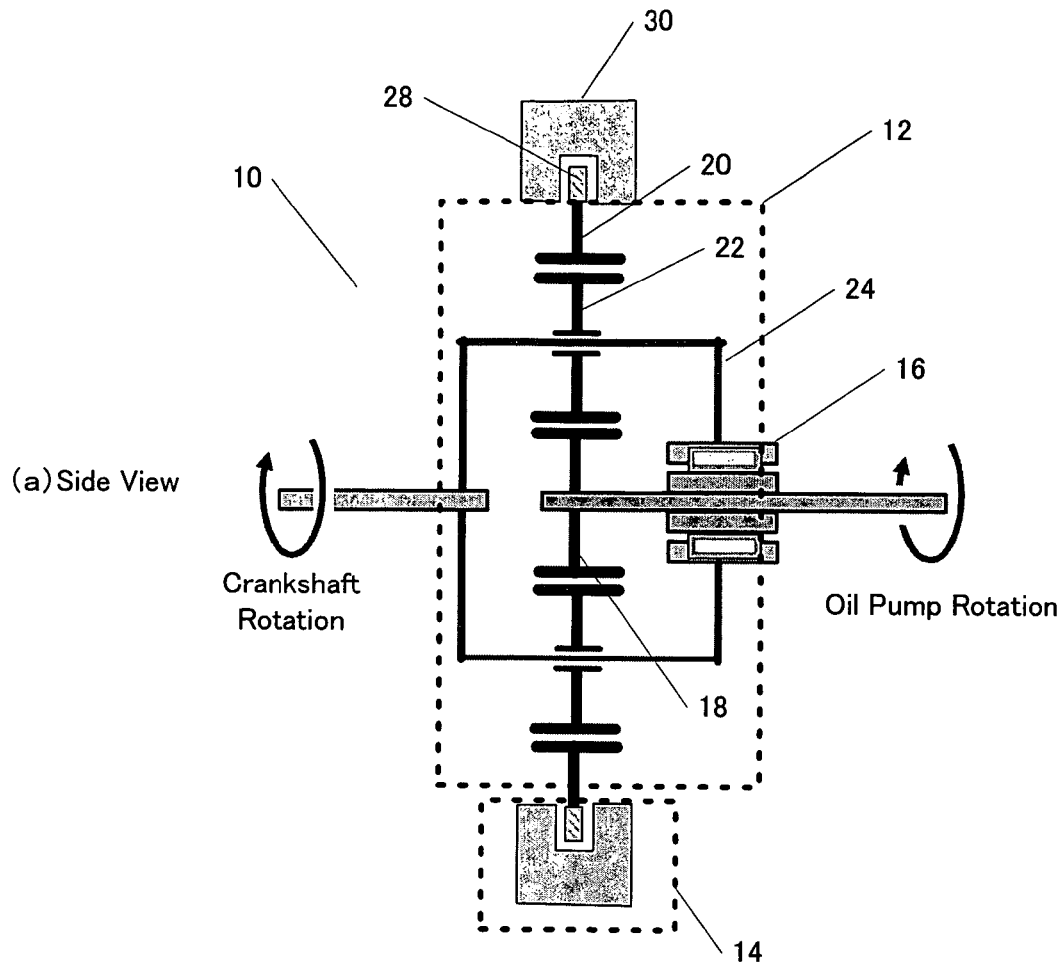
FIG. 1 shows a block diagram of a transmission mechanism for a variable capacity oil pump in accordance with one embodiment of the present invention.
Figure 1:
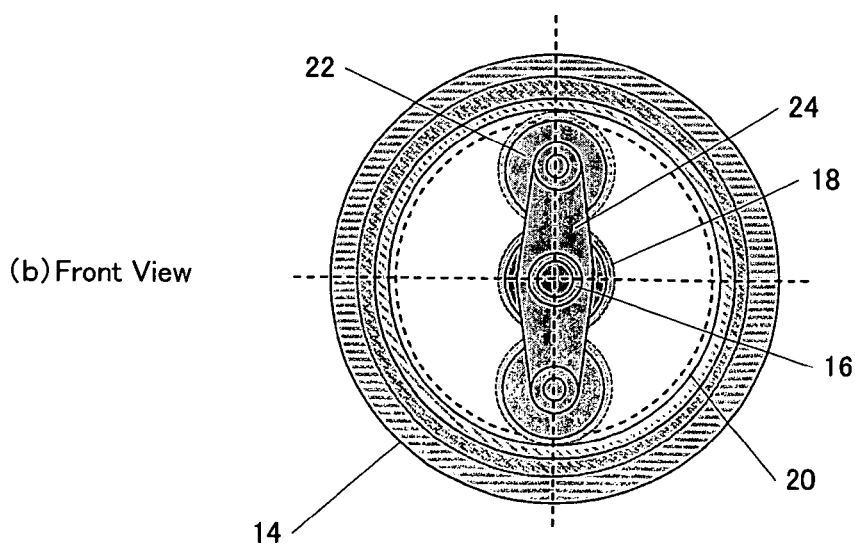

Referring to the drawings, specific embodiments of the invention will be described. According to one embodiment of the invention, a variable capacity oil pump that is capable of variably controlling the rotational speed of the oil pump with respect to the rotational speed of the engine by disposing a transmission mechanism 10 between a crankshaft of the engine and the oil pump is provided. As shown in FIG. 1, the transmission mechanism includes a planetary gear mechanism 12, a hysteresis brake 14 and a one-way clutch 16.

The planetary gear mechanism 12 includes a sun gear 18, a ring gear 20 and a plurality of planetary gears 22. The sun gear 21 is connected to the oil pump. The planetary gears are connected to the crankshaft through a carrier 24. The one-way clutch 16 is provided between the sun gear 18 and the carrier 24. The one-way clutch 16 acts so that the direction of a relative rotation of the sun gear 18 with respect to the carrier 24 is limited to the direction that the carrier 24 rotates, that is, the direction that the crankshaft rotates.

The hysteresis brake 14 is connected to the outer side of the ring gear 20. The hysteresis brake 14 has a hysteresis material portion 28 on the frame of the ring gear so that the brake 14 rotates in accordance with the rotation of the ring gear 20. The hysteresis brake 14 further has an electromagnet 30 surrounding the hysteresis material portion 28. A braking force is generated by a magnetic field from the electromagnet 30. The rotational speed of the ring gear 20 can be adjusted by the brake 14 within a range from stop to a rotational speed equal to the rotational speed of the carrier 24 (that is, the rotational speed of the crankshaft).

Figure 2:
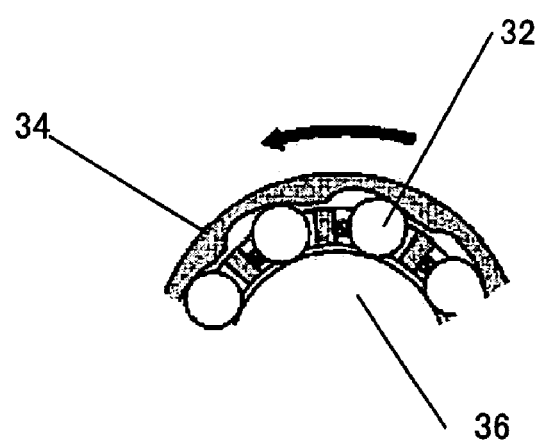
FIG. 2 schematically shows an exemplary structure of a one-way clutch.
Figure 2:
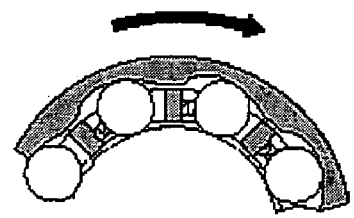

FIG. 2 shows an exemplary structure of the one-way clutch 16. As shown in FIG. 2(a), if an outer ring 34 (which is connected to the carrier 24) tries to rotate in the counterclockwise direction, rollers 32 are received in engagement portions provided on the cam surface of the outer ring by the action of a spring. Thus, a shaft 36 (which is connected to the sun gear 18) is driven by the wedge action between the outer ring cam surface and the shaft 36.

On the other hand, as shown in FIG. 2(b), when the shaft 36 (the sun gear 18) rotates faster than the outer ring 34 (the carrier 24), the outer ring 34 (the carrier 24) relatively rotates in the counterclockwise direction with respect to the shaft 36 (the sun gear 18). The rollers 32 disengage from the outer ring cam surface. Accordingly, the shaft 36 (the sun gear 18) freely rotates with respect to the outer ring 34 (the carrier 24).

Figure 3:
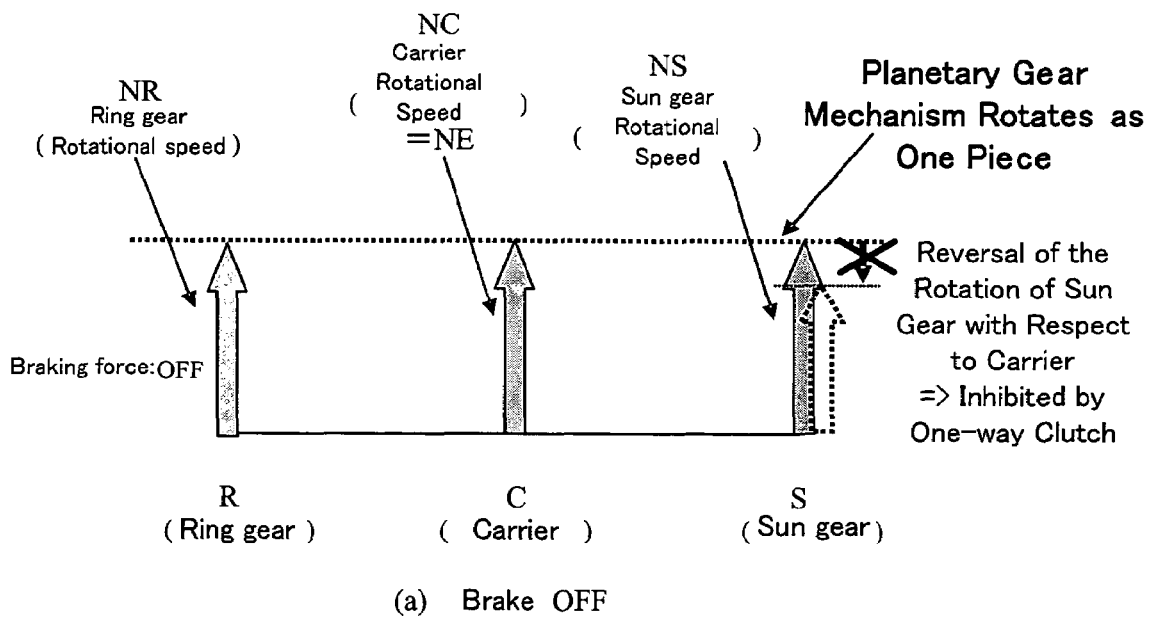
FIG. 3 shows transmission behavior of a transmission mechanism in accordance with one embodiment of the present invention.
Figure 3:
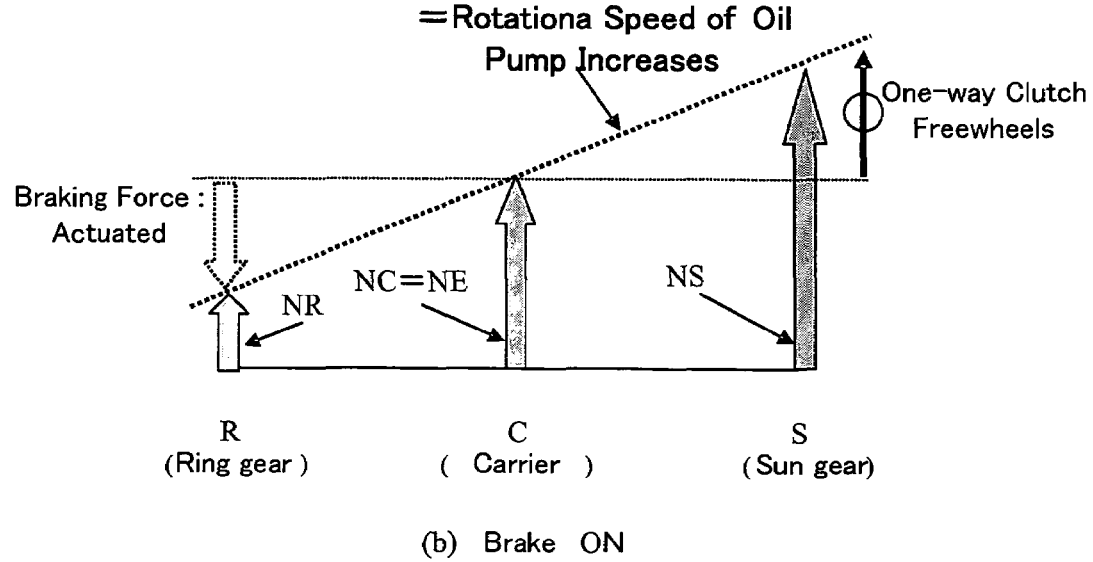

The rotational speed of the oil pump is controlled by combining the operations of the one-way clutch 16 and the hysteresis brake 14. FIG. 3 shows a relationship among the rotational speed NR of the ring gear controlled by the hysteresis brake 14, the rotational speed NC of the carrier connected to the crankshaft, and the rotational speed NS of the sun gear connected to the oil pump.

As shown in FIG. 3(a), when the hysteresis brake 14 is not actuated, the carrier 24, the ring gear 22 and the sun gear 18 rotate as one piece in accordance with the rotation of the crankshaft of the engine. In this case, NS tries to be lower than NC due to driving friction of the oil pump. However, since the one-way clutch 16 limits the relative rotation of the sun gear as described above, NS cannot be lower than NC. Therefore, the rotational speed NS becomes equal to NC. Thus, the planetary gear mechanism 12 rotates as one piece in accordance with the crankshaft. The rotational speed NOP of the oil pump is equal to the engine rotational speed NE.

When the hysteresis brake 14 is actuated, the rotation of the ring gear 20 is restricted by the hysteresis brake 14. The carrier 24 rotates in accordance with the crankshaft of the engine. The planetary gears 22 rotate in accordance with a difference between the rotational speed of the ring gear 20 and the rotational speed of the carrier 24. The sun gear 18 transmits a sum of the rotational speed of the planetary gears 22 and the rotational speed of the carrier 24 to the oil pump. This case is shown in FIG. 2(b). NR is in a decreased state with respect to NC due to the braking force. NS relatively rotates in the clockwise direction with respect to NC. The one-way clutch 16 goes into a freewheeling condition and NS is faster than NC. Thus, the rotational speed NOP of the oil pump increases with respect to the engine rotational speed NE.

If a friction clutch is used, aging and failure tend to occur. According to the invention, since the braking force is generated by the hysteresis brake 14, such aging and failure can be prevented. Further, since the electric power required for brake energy (work) can be reduced to about $\frac{1}{100}$, the transmission according to the invention can suppress a reduction in the fuel efficiency. Thus, the variable capacity pump can improve the fuel efficiency.

The braking force may be generated by a motor. However, the electric power required for a brake driven by the motor is greater than required for the above hysteresis break. Therefore, generating the braking force by a motor may cancel the above described effect regarding the fuel efficiency achieved by the variable capacity oil pump. Further, if a brush motor is used, a failure may occur due to wear of the brush. If a brushless motor is used, a PDU (power distribution unit) is required, which may increase the weight of the pump system and decrease the fuel efficiency.

Figure 4:
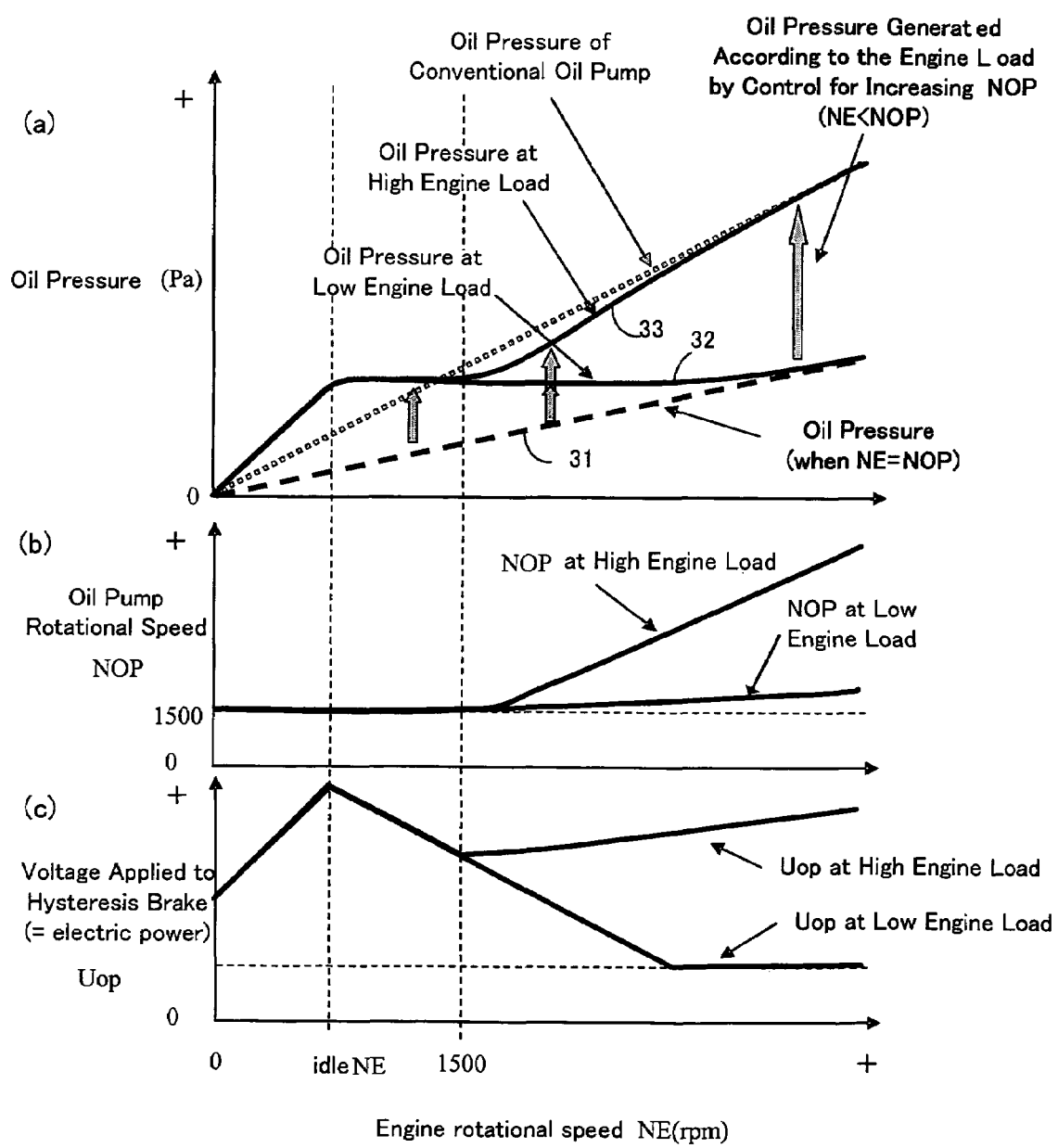
FIG. 4 schematically shows operating characteristics of a variable capacity oil pump.

FIG. 4 shows operating characteristics of the variable capacity oil pump. FIG. 4(a) shows characteristics of the oil pressure with respect to the engine rotational speed. FIG. 4(b) shows characteristics of the rotational speed of the oil pump with respect to the engine rotational speed. FIG. 4(c) shows the voltage applied to the hysteresis brake with respect to the engine rotational speed. Referring to a dashed line 31 of FIG. 4(a), characteristics of the oil pressure when the planetary gear mechanism 12 rotates as one piece in accordance with the crankshaft (in other words, when the brake 14 is not actuated) is shown. The characteristics of the oil pressure as shown by the line 31 are established to meet the oil pressure required when the engine load is low. However, when the engine rotational speed is low, and when the engine load is high, a higher oil pressure is required. Therefore, the oil pressure is increased by increasing the rotational speed of the pump through the control by the hysteresis brake 14, as shown by lines 32 and 33.

Referring to the characteristics of the pump rotational speed, when the engine rotational speed is low, a required pump rotational speed is generated. When the engine load is high, a high pump rotational speed is generated. The pump rotational speed thus generated is greater than the engine rotational speed.

Referring to the characteristics of the voltage applied to the hysteresis brake, in the condition where the engine rotational speed is low and the condition where the engine load is high (these conditions require a higher oil pressure), the voltage applied to the brake 14 is higher than required when the engine load is low.

Figure 11:
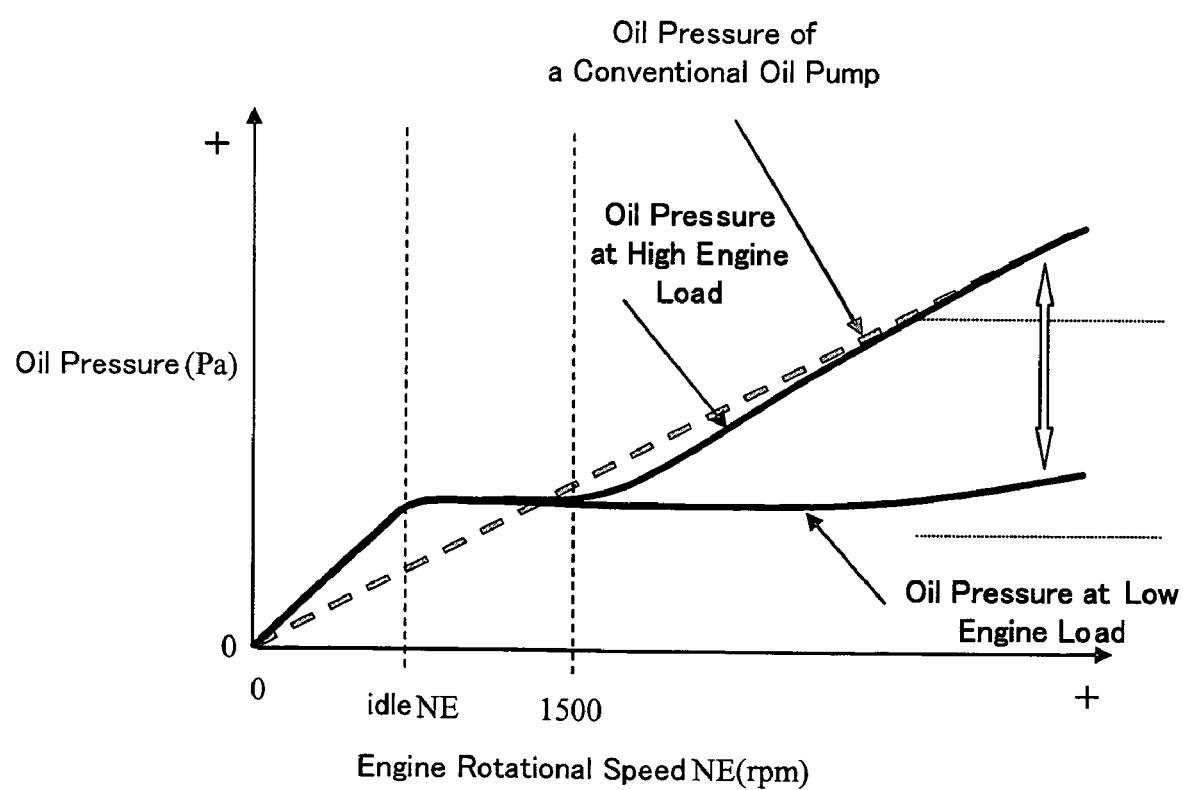
FIG. 11 schematically shows ideal characteristics of the oil pressure of an oil pump.

Thus, a variable capacity oil pump having a transmission mechanism in accordance with one embodiment of the present invention can achieve the ideal characteristics of the oil pressure as shown in FIG. 11.

2. System for Variable Capacity Oil Pump

An oil pump control system using a variable capacity oil pump as described above will be described. A feedback control based on an actual value detected by a sensor provided in the oil pump and a desired value is typically performed. In this embodiment of the present invention, an oil pressure control or a pump rotational speed control is implemented.

2.1 Oil Pressure Control

A desired value for the oil pressure corresponding to the engine rotational speed can be determined referring to the ideal oil pressure characteristics as shown in FIG. 11 or FIG. 4(a). By using this desired value, a feedback control for the oil pump can be performed.

If a conventional PID controller is used as a feedback controller, variations in the error between the desired value and the actual value for oil pressure may be large because the PID control has a tendency to cause the controlled value (the oil pressure) to overshoot. On the other hand, operating characteristics of the hysteresis brake change in accordance with the temperature. If the hysteresis brake is used continuously, the braking capability may decrease and the actual oil pressure may not precisely follow the desired value. Therefore, there is a need for a controller that quickly causes the error to converge without causing the actual oil pressure to overshoot the desired value.

Figure 5:
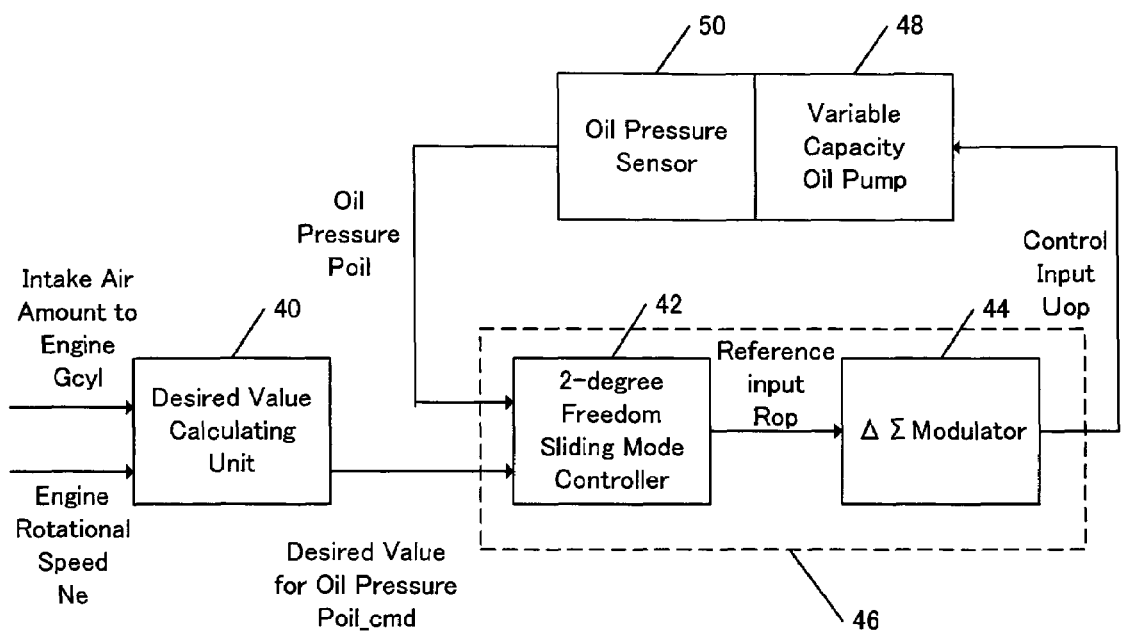
FIG. 5 is a block diagram showing an oil pressure feedback type of oil pump system in accordance with one embodiment of the present invention.

According to one embodiment of the present invention, in order to control the oil pressure more precisely to stabilize the responsiveness of the oil pump, an oil pressure feedback type of oil pump control system as shown in FIG. 5 is configured. The oil pressure Poil that is detected by an oil pressure sensor 50 is controlled to converge to a desired oil pressure value Poil_cmd.

A controller 46 comprises a 2-degree freedom sliding mode controller (hereinafter referred to a "2-degree freedom SMC") 42 and a delta-sigma ($\Delta\Sigma$) modulator 44. According to the 2-degree freedom SMC, the characteristics that the error converges and the characteristics that the error follows a desired value can be separately controlled. Since the 2-degree freedom SMC can specify the behavior of the error so that the error gradually approaches the desired value, overshooting of the error can be prevented. The sliding mode control is one type of the response assignment control.

The delta-sigma modulation is capable of accurately controlling the output of the controlled object regardless of the response characteristics of the controlled object as long as the controlled object has a capability of reconstructing on/off inputs. The delta-sigma modulation can implement an accurate braking control regardless of variations in the response of the brake.

A control method according to this embodiment will be now described. At first, a load parameter based on an intake air amount Gcyl of the engine, which is typically detected by an air flow meter of the engine, and the engine rotational speed Ne, which is typically detected by a sensor provided in the engine, are input into a desired value calculating unit 40. The desired oil pressure value Poil_cmd is determined based on these input values. This desired oil pressure value Poil_cmd and the oil pressure Poil detected by the oil pressure sensor 50 that is provided in the oil pump 48 are input into the 2-degree freedom SMC 42.

The 2-degree freedom SMC 42 calculates a reference input Rop so that the oil pressure sensor output Poil converges to the desired oil pressure value Poil_cmd. Details of the calculation will be described.

The 2-degree freedom SMC 42 performs a low-pass filtering upon the desired oil pressure value Poil_cmd by using a desired value following response assignment parameter pole_f_op as shown in the equation (1). Through this process, the waveform of the desired value, which typically has a step, is smoothed. Thus, the waveform of the desired value is converted to a curve that gradually approaches the desired value.

$$Poil\_cmd\_f(m) = -pole\_f\_op \cdot Poil\_cmd\_f(m-1) + (1+pole\_f\_op)Poil\_cmd(m) \quad (1)$$

Poil_cmd_f represents a desired value after the filtering process and "m" represents a control time. In this embodiment, a control cycle of the 2-degree freedom SMC is 50 milliseconds. The response assignment parameter is set to satisfy $-1 < pole\_f\_op < 0$.

As seen in the equation (1), the trajectory of the desired value Poil_cmd_f after the filtering process is defined by the response assignment parameter pole_f_op. The speed that the control output Poil follows the desired value Poil_cmd can be specified depending on what form the trajectory for the desired value takes. The 2-degree freedom SMC 42 calculates the reference input Rop so that the oil pressure sensor output Poil converges to the desired oil pressure value Poil_cmd_f thus set.

An error E_op between the oil pressure sensor output Poil and the desired value Poil_cmd_f is determined as shown in the equation (2).

$$E\_op(m) = Poil(m) - Poil\_cmd\_f(m) \quad (2)$$

A switching function σ is defined as shown in the equation (3). The switching function σ defines a convergence behavior of the error. Pole_op is a disturbance suppressing response assignment parameter. The response assignment parameter Pole_op specifies the convergence speed of the error E_op when disturbance is applied. The response assignment parameter pole_op is set to satisfy $-1 < pole\_op < 0$.

$$\sigma\_op(m) = E\_op(m) + pole\_f E\_op(m-1) \quad (3)$$

The reference input Rop is calculated as shown in the equation (4). Krch_op and Kadp_op are feedback gains. The first term in the right side of the equation (4) indicates a proportional term and the second term indicates an integral term. Thus, the equation (4) shows the calculation of the feedback amount according to the PI control where the switching function σ is used as its input.

$$Rop(m) = -Krch\_op \cdot \sigma\_op(m) - Kadp\_op \cdot \sum_{i=0}^{m} \sigma\_op(i) \quad (4)$$

The reference input Rop is input into the delta-sigma modulator 44. The delta-sigma modulator 44 receives the reference input Rop from the 2-degree freedom SMC as an input and applies a delta-sigma modulation algorithm to the reference input Rop to calculate a control input Uop. Details of the calculation will be described.

As shown in the equation (5), the reference input Rop is limited by a limiting function lim_op within a range from a lower limit value Rop_min to an upper limit value Rop_max. In one embodiment of the present invention, the lower limit value Rop_min is set to 2 [v] and the upper limit value Rop_max is set to 8 [v]. After the limiting process, an offset value rop_oft, which is to be used for calculating the control input Uop, is subtracted as shown in the equation (6). In one embodiment of the present invention, the offset value rop_oft is set to 5 [v]. "n" represents a control time. In this embodiment, a control cycle of the control by the delta-sigma modulator is 5 milliseconds.

$$r1\_op(n) = lim\_op(Rop(m)) \quad (5)$$

$$r2\_op(n) = r1\_op(n) - rop\_oft \quad (6)$$

Then, as shown in the equation (7), an error δ_op(n) between the signal r2_op(n) obtained by the above offset process and the previous value Uop'(n-1) for the modulation signal is calculated. As shown in the equation (8), the error signal δ_op(n) is added to the previous value λ_op(n-1) for the integral of the error to determine the current value λ_op(n) for the integral of the error.

$$\delta\_op(n) = r2\_op(n) - Uop'(n-1) \quad (7)$$

$$\lambda\_op(n) = \lambda\_op(n-1) + \delta\_op(n) \quad (8)$$

As shown in the equation (9), a binary non-linear function Fnl_op is applied to the integral of the error λ_op(n) so that the integral of the error is converted to a binary value. Specifically, when the integral of the error λ_op (n) is equal to or greater than zero, the binary non-linear function Fnl_op outputs the modulation signal Uop'(n) having a value of +R. When the integral λ_op (n) is less than zero, the binary non-linear function Fnl_op outputs the modulation signal having a value of −R. Here, R is a predetermined value that is larger than the maximum absolute value of r2_op. Alternatively, when the integral λ_op(n) is zero, a value of zero may be output as the modulation signal. As shown in the equation (10), the offset process is applied to the modulation signal Uop'(n) to determine the control input Uop(n). According to one embodiment of the present invention, the control input thus generated through the delta-sigma modulation has a value of either 5+R [v] or 5−R [v].

$$Uop'(n) = Fnl\_op(\lambda\_op(n)) \quad (9)$$

$$Uop(n) = Uop'(n) + rop\_oft \quad (10)$$

The above-described controller comprises a modulator that uses the delta-sigma modulation algorithm. Alternatively, the modulator may be configured to use a sigma-delta (ΣΔ) modulation algorithm or a delta (Δ) modulation algorithm. The following equations used in such algorithms are similar to the equations (5) through (10) used in the above delta-sigma modulation. In the following, λ represents the integral and δ represents the subtraction.

Equations performed in the sigma-delta modulator are shown in the equations (11) through (17).

$$r1\_op(n) = lim\_op(Rop(m)) \quad (11)$$

$$r2\_op(n) = r1\_op(n) - rop\_oft \quad (12)$$

$$\lambda r\_op(n) = \lambda r\_op(n-1) + r2\_op(n) \tag{13}$$

$$\lambda u\_op(n) = \lambda u\_op(n-1) + Uop'(n-1) \tag{14}$$

$$\delta ru\_op(n) = \lambda r\_op(n) - \lambda u\_op(n) \tag{15}$$

$$Uop'(n) = Fnl\_op(\delta ru\_op(n)) \tag{16}$$

$$Uop(n) = Uop'(n) + rop\_oft \tag{17}$$

Equations performed in the delta modulator are shown in the equations (18) through (23).

$$r1\_op(n) = lim\_op(Rop(m)) \tag{18}$$

$$r2\_op(n) = r1\_op(n) - rop\_oft \tag{19}$$

$$\lambda u\_op(n) = \lambda u\_op(n-1) + Uop'(n-1) \tag{20}$$

$$\delta ru\_op(n) = r2\_op(n) - \lambda u\_op(n) \tag{21}$$

$$Uop'(n) = Fnl\_op(\delta ru\_op(n)) \tag{22}$$

$$Uop(n) = Uop'(n) + rop\_oft \tag{23}$$

2.2 Pump Rotational Speed Control

In another embodiment of the present invention, a feedback control of the variable capacity oil pump is implemented by using a pump rotational speed sensor. A desired pump rotational speed corresponding to the engine rotational speed can be established from the pump rotational speed characteristics as shown in FIG. 4(b).

Figure 6:
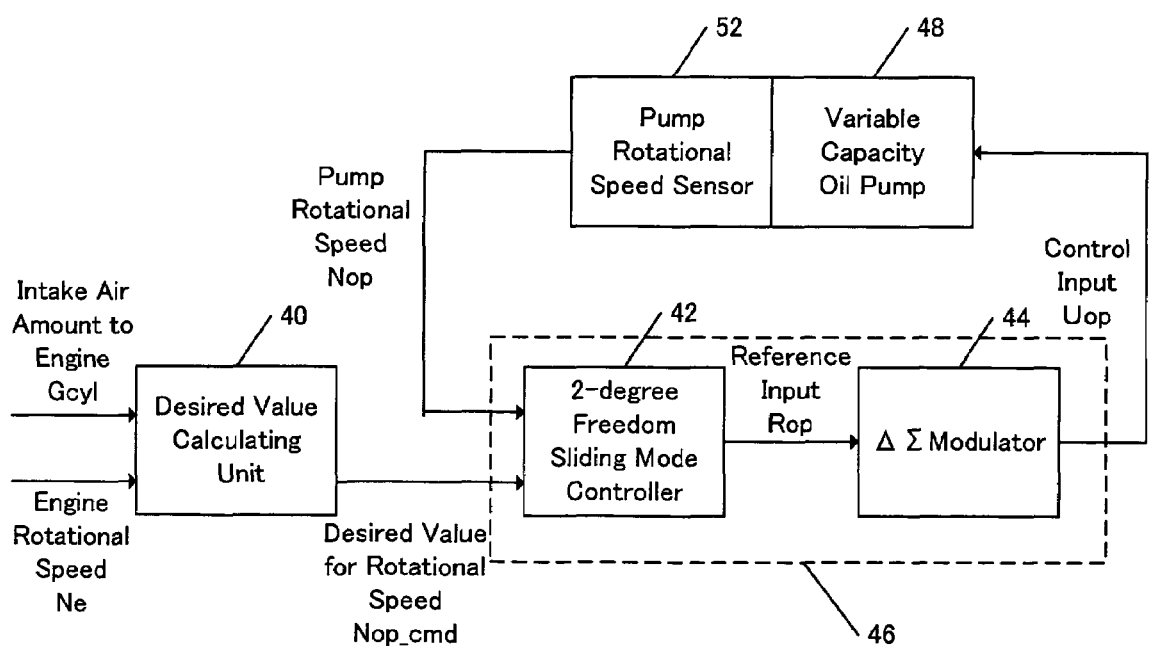
FIG. 6 is a block diagram showing a pump rotational speed feedback type of oil pump system in accordance with one embodiment of the present invention.

FIG. 6 shows a structure of a pump rotational speed feedback type of oil pump control system. A pump rotational speed Nop detected by a pump rotational speed sensor 52 is controlled to converge to a desired rotational speed Nop_cmd corresponding to the engine rotational speed and the load condition of the engine. The controller comprises a 2-degree freedom SMC and a delta-sigma (ΔΣ) modulator in a similar way to those of the oil pressure feedback type of oil pump control system as described above.

A control method of this embodiment will be described. Since the control method is similar to the control method in the above-described oil pressure feedback type of oil pump control system, only differences will be described.

The desired value calculating unit 40 determines a desired pump rotational speed value Nop_cmd based on the engine load parameter (typically, intake air amount Gcyl) and the engine rotational speed. The desired rotational speed value Nop_cmd and the pump rotational speed Nop detected by the pump rotational speed sensor 52 that is provided in the oil pump 48 are input into the 2-degree freedom SMC 42.

The 2-degree freedom SMC 42 calculates a reference input Rop that is to be used for causing the pump rotational speed sensor output Nop to converge to the desired pump rotational speed value Nop_cmd. Equations performed in the calculation will be shown. Since the calculation is similar to the equations (1) through (4), details regarding the calculation will not be described. Variables and functions used in the equations are similar to those used in the equations (1) through (4). As to the same variables and functions as those in the equations (1) through (4), a quotation mark (') is added.

$$Nop\_cmd\_f(m) = -pole'\_f\_op \cdot Nop\_cmd\_f(m-1) + (1 + pole'\_f\_op)Nop\_cmd(m) \tag{24}$$

$$E'\_op(m) = Nop(m) - Nop\_cmd\_f(m) \tag{25}$$

-continued $$\sigma'\_op(m) = E'\_op(m) + pole'\_f \cdot E'\_op(m-1) \tag{26}$$

$$Rop'(m) = -Krch'\_op \cdot \sigma'\_op(m) - Kadp'\_op \cdot \sum_{i=0}^{m} \sigma'\_op(i) \tag{27}$$

Thus, the reference input Rop' is input into the delta-sigma modulator 44.

The delta-sigma modulator 44 receives the reference input Rop' from the 2-degree freedom SMC as an input to calculate a control input Uop by applying the delta-sigma modulation algorithm to the reference input. Since the calculation for determining the reference input is similar to the equations (5) through (10), details regarding the calculation will not be described.

The system according to this embodiment comprises a modulator that uses the delta-sigma modulation algorithm. Alternatively, the modulator may be configured to use the sigma-delta (ΣΔ) modulation algorithm as shown in the equation (11) through (17), or the delta (Δ) modulation algorithm as shown in the equations (18) through (23).

2.3 Control Flow

Figure 7:
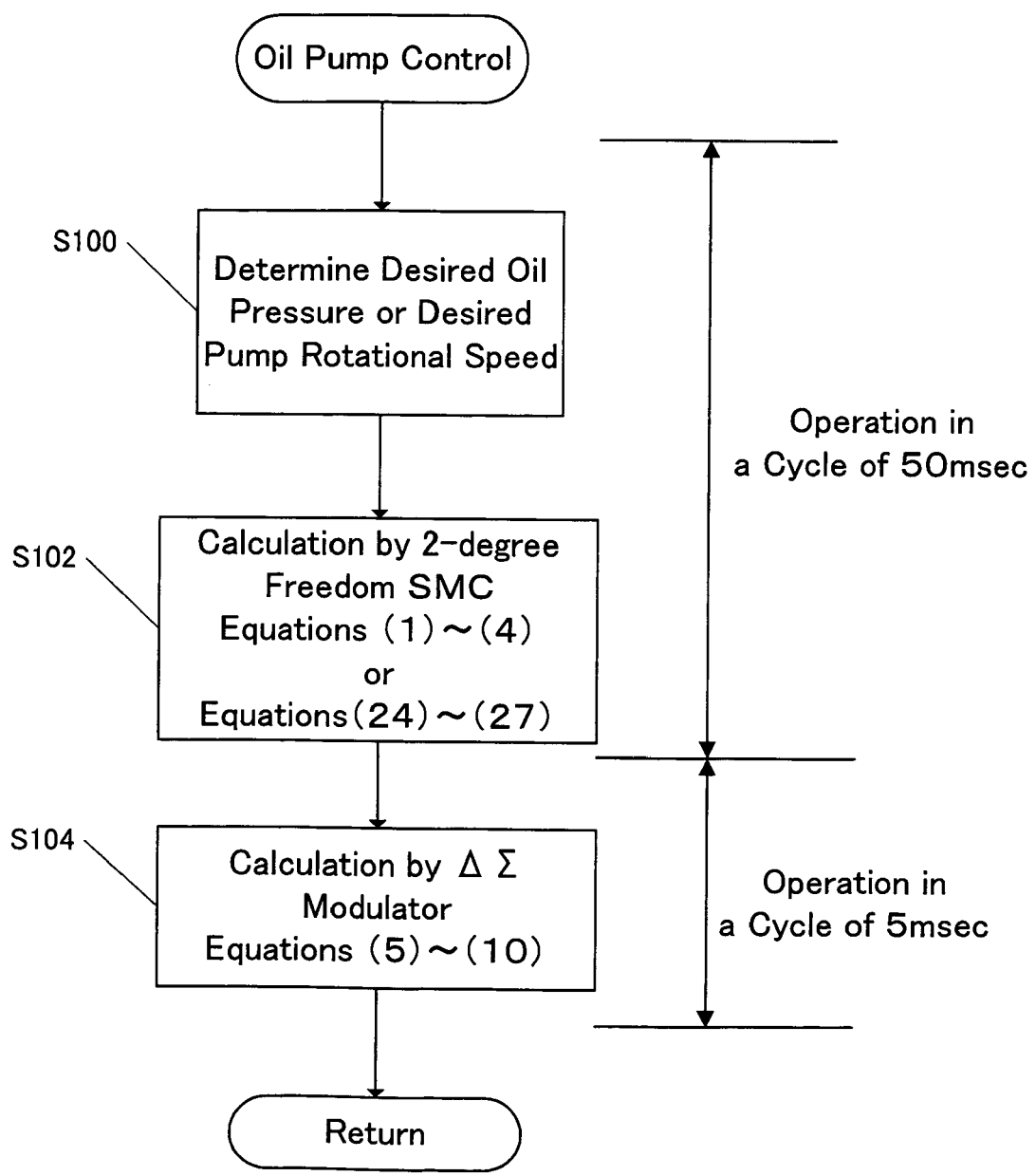
FIG. 7 shows a control flow of a variable capacity oil pump system in accordance with one embodiment of the present invention.

FIG. 7 shows a control flow for the above-described oil pump control system. The control flow has two operation stages. In step S100, the desired oil pressure value or the desired pump rotational speed value is determined based on the engine rotational speed and the load parameter. In step S102, the calculation of the 2-degree freedom sliding mode control is performed to calculate the reference input. The calculation is shown in the equations (1) through (4) or in the equations (24) through (27). The operation of step S100 and step S102 is carried out every 50 milliseconds in one embodiment of the present invention. Next, based on the calculated reference input, the delta-sigma modulation algorithm is performed to calculate the control input in step S104. The operation of step S104 is carried out every 5 milliseconds.

3. System for Variable Capacity Water Pump

The transmission mechanism 10 for the variable capacity oil pump as shown in FIG. 1 can be used for implementing a variable capacity water pump 56 by replacing the oil pump connected to the sun gear 18 with the water pump. A control system for the water pump is similar to the control system for the oil pump. In one embodiment of the present invention, a water temperature control or a pump rotational speed control is implemented.

Figure 8:
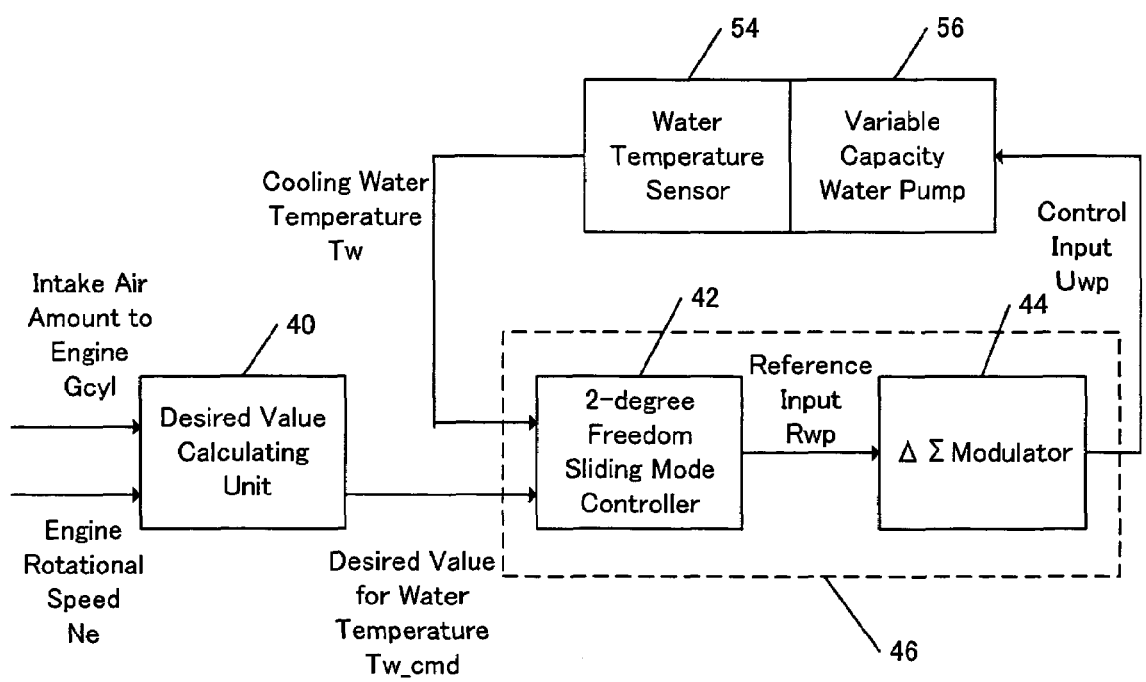
FIG. 8 is a block diagram showing a water temperature feedback type of water pump system in accordance with one embodiment of the present invention.

FIG. 8 shows a water temperature feedback type of water pump control system. A controller 46 includes a 2-degree freedom sliding mode controller 42 and a delta-sigma (ΔΣ) modulator 44 in a similar way to the oil pump system as described above. A water temperature sensor 54 is provided in the water pump. A cooling water temperature Tw that is an output of the sensor 54 and a desired water temperature value Tw_cmd that is determined by the desired value calculating unit 40 are input into the controller 46. Details of the equations performed by the 2-degree freedom sliding mode controller for calculating the reference input Rwp are omitted because they are represented in a similar way to the equations (1) through (4) except that symbols used in the equations are different. Similarly, details of the equations performed by the delta-sigma modulator for calculating the control input Uwp from the reference input Rwp are omitted because they are similar to the equations (5) through (10).

Figure 9:
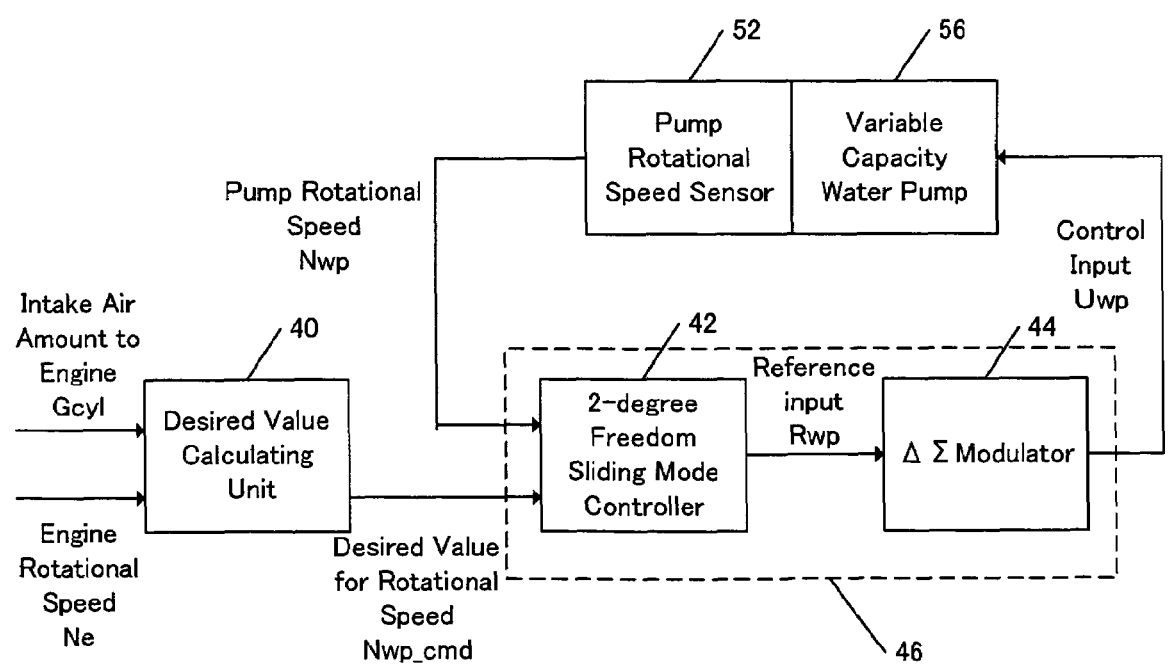
FIG. 9 is a block diagram showing a pump rotational speed feedback type of water pump system in accordance with one embodiment of the present invention.

FIG. 9 shows a pump rotational speed feedback type of water pump control system. A pump rotational sensor 52 is provided in the water pump. A water pump rotational speed Nwp that is an output of the sensor 52 and a desired rotational speed value Nwp_cmd that is determined by the desired value calculating unit 40 are input into the controller 46. Calculation by the controller is performed in a similar way to the water temperature feedback type of water pump control system.

Figure 10:
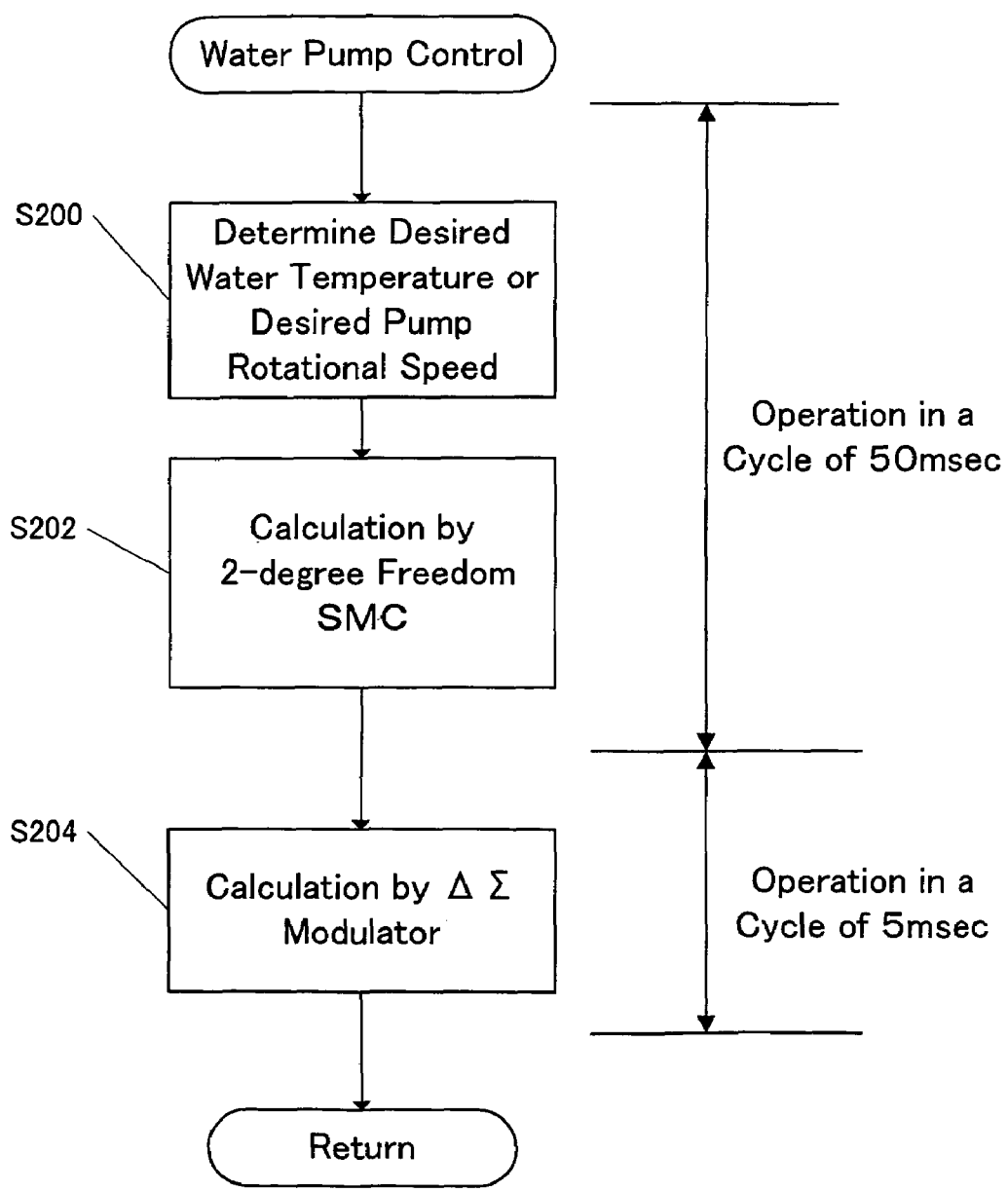
FIG. 10 shows a control flow of a variable capacity water pump system in accordance with one embodiment of the present invention.

FIG. 10 is a control flow for the above-described water pump control system. The control flow has two operation stages. In step S200, the desired water temperature value or the desired pump rotational speed value is determined based on the engine rotational speed and the load parameter. In step S202, the calculation of the 2-degree freedom sliding mode control is performed to calculate the reference input. The calculation is performed as shown in the equations (1) through (4) or in the equations (24) through (27). The operation of step S200 and step S202 is carried out every 50 milliseconds in one embodiment of the present invention. Next, based on the calculated reference input, the delta-sigma modulation algorithm is performed to calculate the control input in step S204. The operation of step S204 is carried out every 5 milliseconds.

Although the present invention has been described referring to the specific embodiments, the invention is not limited to those specific embodiments.

What is claimed is:

1. A variable capacity fluid pump for an engine, comprising:
   a planetary gear mechanism having a first gear, a second gear and a third gear, the second gear being connected to a crankshaft of the engine to transmit a rotational force of the crankshaft, the third gear being connected to the fluid pump;
   braking means connected to the first gear, the braking means generating a braking force upon the first gear; and
   a one-way clutch provided between the second gear and the third gear,
   wherein the braking means controls a rotational speed of the first gear through the braking force so that a rotational speed of the fluid pump can be controlled independently of a rotational speed of the crankshaft.

2. The variable capacity fluid pump of claim 1, wherein the first gear includes a ring gear, the second gear includes a plurality of planetary gears, and the third gear includes a sun gear.

3. The variable capacity fluid pump of claim 1, wherein the braking means comprises a hysteresis material portion that is provided to rotate in accordance with the first gear and an electromagnet for generating a magnetic field through the hysteresis material portion,
   wherein the braking force is increased or decreased by adjusting the magnetic field.

4. The variable capacity fluid pump of claim 1, wherein the braking force is determined so that an output of a sensor provided in the fluid pump converges to a desired value, the desired value being set in accordance with an operating condition of the engine.

5. The variable capacity fluid pump of claim 1, wherein the braking force is determined by a 2-degree freedom response assignment control.

6. The variable capacity fluid pump of claim 1, wherein the braking force is controlled by a controlled variable that is modulated by one of a delta-sigma modulation algorithm, a sigma-delta modulation algorithm and a delta modulation algorithm.

7. The variable capacity fluid pump of claim 4, wherein the fluid pump is an oil pump.

8. The variable capacity fluid pump of claim 7, wherein the sensor is an oil pressure sensor for detecting an oil pressure of the oil pump.

9. The variable capacity fluid pump of claim 7, wherein the sensor is a rotational speed sensor for detecting a rotational speed of the oil pump.

10. The variable capacity fluid pump of claim 4, wherein the fluid pump is a water pump.

11. The variable capacity fluid pump of claim 10, wherein the sensor is a water temperature sensor for detecting a water temperature of the water pump.

12. The variable capacity fluid pump of claim 10, wherein the sensor is a rotational speed sensor for detecting a rotational speed of the water pump.

13. The fluid pump of claim 1, wherein the one-way clutch acts to allow a relative rotation of the third gear with respect to the second gear to rotate in a direction that the crankshaft rotates and prohibit the relative rotation from rotating in a direction opposite to the direction that the crankshaft rotates.

14. A method for controlling a rotational speed of a fluid pump for an engine, the fluid pump comprising a planetary gear mechanism that includes a first gear connected to a braking means, a second gear connected to a crankshaft of the engine, and a third gear connected to the fluid pump, the method comprising the steps of:
   applying a braking force to the first gear through the braking means;
   controlling the braking force to control a rotational speed of the first gear; and
   through the control of the rotational speed of the first gear, controlling a rotational speed of the fluid pump independently of a rotational speed of the crankshaft.

15. The method of claim 14, wherein the first gear includes a ring gear, the second gear includes a plurality of planetary gears, and the third gear includes a sun gear.

16. The method of claim 14, wherein the braking means comprises a hysteresis material portion that is provided to rotate in accordance with the first gear and an electromagnet for generating a magnetic field through the hysteresis material portion,
   the method further comprising the step of adjusting the magnetic field to increase or decrease the braking force.

17. The method of claim 14, further comprising the step of:
   determining the braking force so that an output of a sensor provided in the fluid pump converges to a desired value, the desired value being set in accordance with an operating condition of the engine.

18. The method of claim 14, further comprising the step of:
   performing a 2-degree freedom response assignment control to determine the braking force.

19. The method of claim 14, further comprising the step of:
   modulating the braking force to be applied by one of a delta-sigma modulation algorithm, a sigma-delta modulation algorithm and a delta modulation algorithm.

20. The method of claim 17, wherein the fluid pump is an oil pump.

21. The method of claim 20, wherein the sensor is an oil pressure sensor for detecting an oil pressure of the oil pump.

22. The method of claim 20, wherein the sensor is a rotational speed sensor for detecting a rotational speed of the oil pump.

23. The method of claim 17, wherein the fluid pump is a water pump.

24. The method of claim 23, wherein the sensor is a water temperature sensor for detecting a temperature of the water pump.

25. The method of claim 23, wherein the sensor is a rotational speed sensor for detecting a rotational speed of the water pump.

26. The method of claim 14, further comprising the steps of:
- allowing a relative rotation of the third gear with respect to the second gear to rotate in a direction that the crankshaft rotates; and
- prohibiting the relative rotation from rotating in a direction opposite to the direction that the crankshaft rotates.

27. A variable capacity fluid pump system for an engine, comprising:
- planetary gear means having a first gear, a second gear and a third gear, the second gear connected to a crankshaft of the engine, the third gear connected to the fluid pump;
- braking means for applying a braking means to the first gear; and
- control means for controlling the braking force to control a rotational speed of the first gear so that a rotational speed of the fluid pump is controlled independently of a rotational speed of the crankshaft.

28. The variable capacity fluid pump system of claim 27, wherein the first gear includes a ring gear, the second gear includes a plurality of planetary gears, and the third gear includes a sun gear.

29. The variable capacity fluid pump system of claim 27, wherein the braking means comprises a hysteresis material portion that is provided to rotate in accordance with the first gear and an electromagnet for generating a magnetic field through the hysteresis material portion,
- wherein the control means further includes means for adjusting the magnetic field to increase or decrease the braking force.

30. The variable capacity fluid pump system of claim 27, wherein the control means controls the braking force so that an output of a sensor provided in the fluid pump converges to a desired value, the desired value being set in accordance with an operating condition of the engine.

31. The variable capacity fluid pump system of claim 27, wherein the control means further includes a 2-degree freedom response assignment control means for performing a 2-degree freedom response assignment control to determine the braking force.

32. The variable capacity fluid pump system of claim 27, wherein the control means further includes a modulation means for performing one of a delta-sigma modulation algorithm, a sigma-delta modulation algorithm and a delta modulation algorithm to modulate the braking force.

33. The variable capacity fluid pump system of claim 30, wherein the fluid pump is an oil pump.

34. The variable capacity fluid pump system of claim 33, wherein the sensor is an oil pressure sensor for detecting an oil pressure of the oil pump.

35. The variable capacity fluid pump system of claim 33, wherein the sensor is a rotational speed sensor for detecting a rotational speed of the oil pump.

36. The variable capacity fluid pump system of claim 30, wherein the fluid pump is a water pump.

37. The variable capacity fluid pump system of claim 36, wherein the sensor is a water temperature sensor for detecting a water temperature of the water pump.

38. The variable capacity fluid pump system of claim 36, wherein the sensor is a rotational speed sensor for detecting a rotational speed of the water pump.

39. The variable capacity fluid pump system of claim 27, further comprising:
- a one-way clutching means provided between the second gear and the third gear, the one-way clutching means allowing a relative rotation of the third gear with respect to the second gear to rotate in a direction that the crankshaft rotates, the one-way clutching means prohibiting the relative rotation from rotating in a direction opposite to the direction that the crankshaft rotates.

* * * * *